Nov. 3, 1964 J. A. TOURTELLOT 3,155,779

STEREOPHONIC PHONOGRAPH SYSTEM

Filed March 31, 1958

INVENTOR.
JOHN A. TOURTELLOT

BY

ATTORNEY 3,155,779
Patented Nov. 3, 1964

3,155,779

STEREOPHONIC PHONOGRAPH SYSTEM

John A. Tourtellot, Merchantville, N.J., assignor to Radio Corporation of America, a corporation of Delaware Filed Mar. 31, 1958, Ser. No. 724,957
11 Claims. (Cl. 179—100.4)

This invention relates to phonograph systems and more particularly to stereophonic phonograph systems for reproducing records of the type having two stereophonically related recordings in the same record groove.

Phonograph records have heretofore been proposed which have two stereophonically related selections recorded in the same record groove. By way of example, one of the two recordings may be cut vertically producing vertical record groove undulations, and the other recording may be cut laterally producing lateral groove undulations. Such records will be referred to as vertical-lateral records. Alternatively, the stereophonically related recordings may be cut at right angles to each other in the same record groove, with each being at the same angle, such as 45°, with respect to the record surface. Such records will hereinafter be referred to as 45–45 records.

It is desirable that a stereophonic phonograph system, designed primarily for reproduction of one of the vertical-lateral or 45–45 types of records, also be readily adaptable for use with the other of these types of records. Furthermore, it is desirable that stereophonic phonograph reproducing systems be compatible with the many millions of records currently in use having only a single recording most of which are cut with lateral groove undulations. The type of record having only a single recording will be referred to as a monaural record.

Accordingly, it is an object of the present invention to provide a simple and efficient stereophonic phonograph system.

It is a further object of this invention to provide an improved stereophonic phonograph system which is compatible with existing monaural records, and is readily adaptable for use with other known types of stereophonic records.

Another object of this invention is to provide an improved stereophonic phonograph system in which the existing components of the system may be efficiently utilized for the reproduction of laterally cut monaural records.

The stereophonic phonograph system of the invention includes a pickup device adapted to provide a pair of electrical signals. If a 45–45 pickup is used with a 45–45 record, or a vertical-lateral pickup is used with a vertical-lateral record the two electrical signals will correspond to the two stereophonically related recordings in the record groove. However, if a 45–45 pickup is used with a vertical-lateral record, or a vertical-lateral pickup is used with a 45–45 record, each of the two electrical signals will be comprised of a complex combination of components of both recordings.

The two electrical signals are applied through separate amplifying systems to opposite halves of the primary winding of a first output transformer. The primary winding of a second output transformer is connected between a tap point on the first output transformer primary winding and an operating potential supply source. The sum of the two electrical signals is developed across the first output transformer primary winding, and the difference between these signals is developed across the second output transformer primary winding. The signals developed across secondary windings of the first and second output transformers are applied to sound reproducing devices in a manner to derive sound signals corresponding to the two recordings of the stereophonic record. For example, where a 45–45 pickup is used with a 45–45 record, or a vertical-lateral pickup is used with a vertical-lateral record the sum and difference signals across the two secondary windings are combined to derive amplified versions of the original signals. Where a 45–45 pickup is used with a vertical-lateral record or a vertical-lateral pickup is used with a 45–45 record, separate sound reproducers may be directly driven from the two secondary windings to reproduce stereophonic sound.

The stereophonic phonograph system of the invention is also compatible with existing monaural records. Further in accordance with the invention the electrical signals provided by the stereophonic pickup in scanning a monaural record are applied in push-pull relation to the two amplifying channels to efficiently utilize the stereophonic system components and at the same time provide the advantages of second harmonic distortion reduction, more efficient power amplification and the like. A stereophonic phonograph system using a 45–45 type of pickup is particularly advantageous in this respect, since both transducing elements of the pickup are responsive to vertical and lateral groove undulations. Hence, the pickup can be connected so that electrical signals resulting from the recordings on a monaural record will be applied to the two amplyifying systems in push-pull relation without the necessity of a phase inversion stage.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 1:
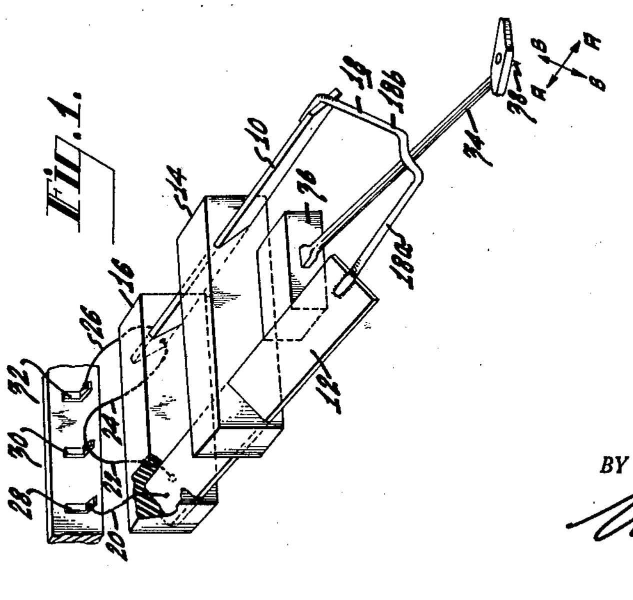
FIGURE 1 is a perspective view of a phonograph pickup for reproducing the recordings of a 45–45 phonograph record having two stereophonically related records cut in the same groove.

Reference is now made to the drawings wherein like reference numerals will be used to designate similar elements throughout. FIGURE 1 of the drawings shows the operating elements of a stereophonic phonograph pickup cartridge for reproducing the two recordings of a 45–45 phonograph record. The pickup cartridge casing which normally encloses these elements has not been shown to better illustrate the pickup structure and operation. As is conventional, the pickup will normally be mounted near the free end of a pivotally movable tone arm for transverse movement across the surface of a phonograph record.

The operating elements of the stereophonic pickup include a pair of elongated piezoelectric transducing elements 10 and 12 of rectangular cross-section. These transducing elements are supported by a pair of spaced damping blocks 14 and 16 of resilient material which have openings cut or otherwise formed therein for receiving and accurately positioning the transducing elements 10 and 12 with respect to each other. In order that the transducing elements 10 and 12 be accurately positioned with respect to the cartridge casing (not shown), the dimensions of the damping blocks 14 and 16 may be made slightly greater than the cavity formed within the cartridge casing so that sufficient pressure is provided through the damping blocks 14 and 16 to anchor the transducing elements 10 and 12 securely in position.

The openings in the damping blocks 14 and 16 are cut so that the major surfaces of the transducing elements 10 and 12 lie in perpendicular planes, with each plane disposed at an angle of 45° to a plane extending vertically through the longitudinal axis of the pickup device. The free ends of the transducing elements 10 and 12, which are arranged and polarized to produce a voltage in response to a bending stress, are driven by a yoke member 18 which is formed of a single piece of wire to have a pair of divergent legs 18*a* and 18*b* and a reentrant central portion. The yoke member 18 could as well be formed in generally the same shape using a plastic material such as viscoloid. The legs of the yoke member 18 are constructed of a dimension and material to be relatively stiff axially but flexible in all direcitons perpendicular to the axis thereof. As shown in the drawings, the yoke member lies in a plane perpendicular to the longitudinal axis of the transducing elements 10 and 12 with each of the divergent legs thereof being normal to the major surfaces of the particular transducing element to which it is affixed. Thus, the components of force applied to the yoke member 18, which are parallel to the axis of the respective legs will be readily transmitted to the transducing elements 10 and 12 to cause bending thereof.

Electrical connections are provided to the transducing elements 10 and 12 by the conductors 20, 22, 24 and 26 which are connected between the terminals 28, 30 and 32, and electrodes on the opposite sides of the two transducing elements 10 and 12. The terminal 30 serves as a common terminal for both of the transducing elements. Thus, electrical signals corresponding to one of the separable recordings of a 45–45 record may be derived from the terminals 28 and 30 and electrical signals corresponding to the other recording may be derived from the terminals 30 and 32.

The stylus assembly for the pickup comprises a stylus arm 34, one end of which is embedded in a block of resilient material 36 to urge the stylus arm 34 into engagement with the reentrant portion of the yoke member 18. A stylus member 38, which is adapted to scan a record groove, is supported at the free end of the stylus arm 34.

In a 45–45 record, one of the recordings is cut in a direction indicated by the arrows A—A, and the other in a direction indicated by the arrows B—B. These recordings are ordinarily at right angles to each other with each being at an angle of 45° with respect to the record surface. Naturally other angles of recording could be used such as where each of the recordings is cut at an angle of 60° with respect to the record surface. The stylus member 38, in following the undulations of a groove having only the channel A—A recording, would move back and forth along a line generally coincident with the axis of the leg 18*a* which is affixed to the transducing element 12. Since the leg 18*a* is stiff axially, these vibrations will be directed through the stylus arm 34 and the leg 18*a* to the transducing element 12 causing it to bend so that an electrical signal is generated by this element. At the same time, this motion is generally in a plane perpendicular to the axis of the leg 18*b* of the yoke member 18 which is affixed to the transducing element 10. Since the leg 18*b* is flexible in directions perpendicular to the axis thereof as mentioned above, the leg 18*b* flexes back and forth with the motion of the stylus arm 34 and causes substantially no bending of the transducing element 10, thereby producing no electrical output signal from this transducing element.

The same action occurs for recordings cut at an angle indicated by the arrows B—B except that such vibrations are readily transmitted to the transducing element 10 causing electrical signals to be produced in response thereto, with negligible effect on the transducing element 12. Naturally, with recordings in both channels, the movement of the stylus arm 34 is complex, causing motion which has components that produce bending of both the transducing elements 10 and 12. For example, if like in-phase signals are simultaneously recorded in channels A and B, the net effect of the record groove is to move the stylus arm 34 up and down in a vertical plane. This produces equal axial components of motion which are directed along the legs 18*a* and 18*b* of the yoke member 18 so that equal bending of the transducing elements 10 and 12 occurs, and accordingly corresponding in-phase signals of equal amplitude will be derived from the upper electrodes of the two transducing elements with respect to the lower electrodes thereof.

If the two signals recorded in channels A and B are recorded at 180° out-of-phase, then the net effect is to move the stylus arm 34 laterally. This produces equal and opposite axial components of motion in legs 18*a* and 18*b* causing one of the transducing elements to bend up as the other bends down. Accordingly, equal signals 180° out-of-phase will be derived from the upper electrodes of the two transducing elements with respect to the lower electrodes thereof. Naturally, if the connections from one of the transducing elements to the terminals is reversed, the phasing of the signals at the terminals 28, 30 and 30, 32 will be such that lateral undulations appear to produce corresponding in-phase signals of equal amplitude and vertical undulations will appear to produce equal signals 180° out-of-phase.

Figure 2:
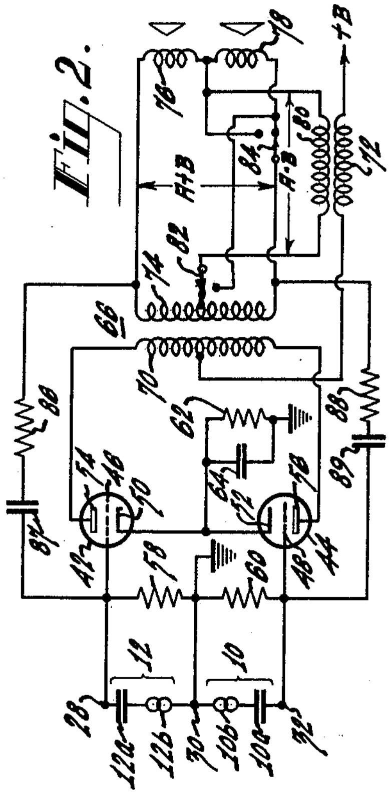
FIGURE 2 is a schematic circuit diagram of a single ended stereophonic phonograph amplifying system embodying the invention.

Referring now to FIGURE 2, the transducing elements 10 and 12 are shown in equivalent circuit form. For piezoelectric crystals, such as barium titanate ceramic elements, the transducers generally are capacitive and appear as a capacitor in series with a signal generator. Thus, the equivalent circuit for the transducing element 10 comprises a capacitor 10*a* and a signal generator 10*b* in series, and the transducing element 12 appears as a capacitor 12*a* in series with a signal generator 12*b*. One electrode of each of the transducing elements 10 and 12 is connected to the common terminal 30, and the other electrodes of these transducers are connected to the terminals 32 and 28 respectively. The connections to the transducing elements 10 and 12 may be assumed to be the same as that shown in FIGURE 1 so that lateral motion of the pickup stylus 38 produces push-pull electrical signals (180° out-of-phase) at the thermals 28 and 32. In other words, when the signal at terminal 28 is going positive, the signal at terminal 32 is going negative and vice versa. From a consideration of the stereophonic pickup structure of FIGURE 1, it will be seen that, under these conditions, vertical movement of the pickup stylus causes both of the terminals 28 and 32 to go either positive or negative at the same time.

The stereophonic amplifying system includes a pair of amplifying devices such as electron tubes 42 and 44 which have input electrodes 46 and 48 respectively, common electrodes 50 and 52 respectively and output electrodes 54 and 56 respectively. The terminal 28 is coupled to the input electrode 46 of the tube 42, and the terminal 32 is connected to the input electrode 48 of the tube 44. A pair of impedance elements such as the resistors 58 and 60 which may be of equal resistance value, are serially connected between the control grids 46 and 48. The junction of the resistors 58 and 60 is connected to the common terminal 30 which is at ground potential for the amplifier. The common electrodes 50 and 52 of the amplifying devices are connected together, and through a common resistor 62 which is partially bypassed by a capacitor 64 to ground.

The output circuit for the stereophonic phonograph amplifier system of the invention includes a first transformer 66 having a primary winding 70 which is connected between the output electrodes 54 and 56. A center tap on the primary winding 70 is connected through a primary winding 72 of a second output transformer 68 to an operating potential supply designated +B. The secondary winding 74 of the first output transformer 66 is connected across a pair of serially connected loudspeaker windings 76 and 78, whereas the secondary winding 80 of the second output transformer 68 is connected between the center tap on the secondary winding 74 to the junction between the loudspeaker windings 76 and 78. A pair of switches 82 and 84, which may be ganged together for unicontrol operation, are provided for selectively changing the connections described with the switches in their indicated positions to other connections such that the secondary winding 74 is connected directly across the speaker winding 76, and the secondary winding 80 is connected directly across the speaker winding 78.

Considering now the operation of the stereophonic phonograph system of the invention, the mechanical-to-electrical transducing elements 10 and 12 of the 45–45 pickup are phased so that electrical signals resulting from lateral groove undulations, hereinafter referred to as lateral signal components, are applied to the tubes 42 and 44 in push-pull relation so that the grid 46 is going positive as the grid 48 is going negative. For vertical signal components, or signals which result from vertical groove undulations, the grids 46 and 48 will both go in the same polarity direction at the same time. Thus, vertical signal components cause the tubes 42 and 44 to produce equal and opposite currents in the transformer primary winding 70 so that no signal outputs due to vertical signal components appear across the secondary winding 74. However, since the current flowing through these tubes will be either increasing or decreasing at the same time due to the vertical signal components, and since these currents are combined in the primary winding 72, an output due to vertical signal components will be developed across this winding.

By the same token, the lateral signal components which are in push-pull relation will produce a signal output across the secondary winding 74 of the first output transformer 66, and will produce no signal output across the secondary winding 80 of the second output transformer 68. The latter effect will be understood when it is considered that the current in the tube 42 increases as the current in the tube 44 decreases by the same amount due to lateral signal components, and hence there is no net change of current in the primary winding 72 which is in the common current path for these tubes.

For playing 45–45 records using a 45–45 pickup as shown in FIGURE 1, the switches 82 and 84 are set to the positions shown in FIGURE 2. In those positions the vertical and lateral signal components are combined in a manner so that two signals corresponding to the respective recordings of a 45–45 record are developed respectively across the speaker windings 76 and 78. To understand the operation of this circuit, assume the signal output of the transducer 12 to be A and the output of the transducer 10 to be B. In such case the lateral signal components are $A+B$ since the latter signal components of the two mechanical-to-electrical transducing elements are series aiding. On the other hand, the vertical signal components are $A-B$ since the mechanical-to-electrical transducing elements of the pickups are connected in series opposition. Thus, the signal potential appearing between the anodes 54 and 58 and across the secondary winding 74 is due to the latter signal components or $A+B$, whereas the signal potential across the secondary winding 80 is due to the vertical signal components or $A-B$. Tracing the circuit for the speaker winding 76, the driving signal therefor comprises that developed across the top half of the secondary winding 74 of the first output transformer 66 which is $A+B$ together with a signal developed across the secondary winding 80 of the second output transformer 68 which is $A-B$. Totaling these signal components $$(A+B)+(A-B)$$

the net signal appearing across the speaker winding 76 is 2A which corresponds to only the signal from the transducing element 12 of the pickup.

The signals developed across the speaker winding 78 comprise those signals developed across the lower half of the secondary winding 74 $(A+B)$ and the reverse phase of the signals across the secondary winding 80 which is minus $(A-B)$. The sum of these signals which drives the speaker winding is $(A+B)-(A-B)$ or 2B which corresponds to the signal output from only the transducing element 10. The ½ factor resulting from the $A+B$ signals being taken from only ½ of the transformer 74 has been neglected for purposes of simplicity. It will be understood that the proper balance between these signals may be attained by adjustment of the turns ratio of the transformers 66 and 68, for example.

In the event that the 45–45 pickup is to be used to play a stereophonic record wherein the two stereophonically related recordings are cut with vertical and lateral undulations respectively, the switches 82 and 84 are moved to their alternate positions as shown in dotted lines. In the alternate positions of these switches, the secondary winding 80 is connected directly across the speaker winding 78 whereas the secondary winding 74 is connected directly across the speaker winding 76. Since the signals developed across the secondary windings of these transformers corresponds to the vertical and lateral signal components respectively, the sound reproduced by the two speakers will correspond respectively with the two recordings.

The stereophonic phonograph system of the invention is also compatible with the many millions of monaural records currently in use. As described in connection with FIGURE 1, lateral stylus motion causes an electrical output to be produced from both of the mechanical-to-electrical transducing elements 10 and 12. Accordingly, since most monaural records currently in use have lateral groove undulations, the transducing elements are connected in such a manner that the lateral signal components are applied to the tubes 42 and 44 in push-pull relation. Thus, the two stereophonic phonograph amplifying channels operate in push-pull relation for monaural records without requiring a phase inverter. In this manner, most efficient use of the system components may be obtained while realizing the attendant advantages of reduced second harmonic distortion, more efficient amplifier power gain associated with push-pull operation.

The frequency response of the vertical and lateral signal components may be individually controlled in the amplifier circuit shown in FIGURE 2. As noted above, the change in current through the tube 42 due to lateral signal components increases as the current through tube 44 decreases, thereby producing zero change in current in the cathode resistor 62. However, for vertical signal components, the current in the two tubes 42 and 44 increases or decreases at the same time. Thus, by partially bypassing the resistor 62 with the capacitor 64, the frequency response of the amplifying system for vertical signal components can be controlled. In effect, the capacitor 64 causes increased degeneration for low frequency vertical signal components thereby eliminating low frequency noise, such as rumble, due to vertical vibrations which may be superimposed on the transduced signals.

The lateral frequency response may be individually controlled by providing feedback circuits for the amplifiers from opposite ends of the secondary winding 74 to the input electrodes 46 and 48. For the tube 42 the feedback network comprises a resistor 86 and a capacitor 87, whereas for the tube 44 the feedback network comprises a resistor 88 and a capacitor 89. Since there are no vertical signal components developed across the secondary winding 74, the feedback loops described have no effect for these signals. However, for lateral signal components, one end of the winding 74 goes in a positive direction as the other end goes in a negative direction causing differences in potential which produce the necessary feedback currents. In this manner the lateral signal component frequency response may be individually controlled.

The stereophonic phonograph system of the invention as shown in FIGURE 2, may also use a well known form of vertical-lateral pickup. When such a pickup is used with a vertical-lateral stereophonic phonograph record, stereophonic sound reproduction will be obtained when the switches 82 and 84 are in the positions shown in solid lines. When the vertical-lateral pickup is used with 45–45 stereophonic phonograph records, stereophonic sound will be reproduced when the switches 82 and 84 are in their alternate positions as shown in dotted lines. However, under the conditions where a vertical-lateral phonograph pickup is used, with the usual type of laterally cut monaural phonograph record, signals are applied to only one of the amplifying devices 42 and 44. In order that the stereophonic amplifying channels be connected for push-pull operation during the reproduction of a monaural record, it will be necessary to provide a phase inverter between the input electrode of the energized amplifier and the input electrode of the other amplifier as shown in FIGURE 3.

Figure 3:
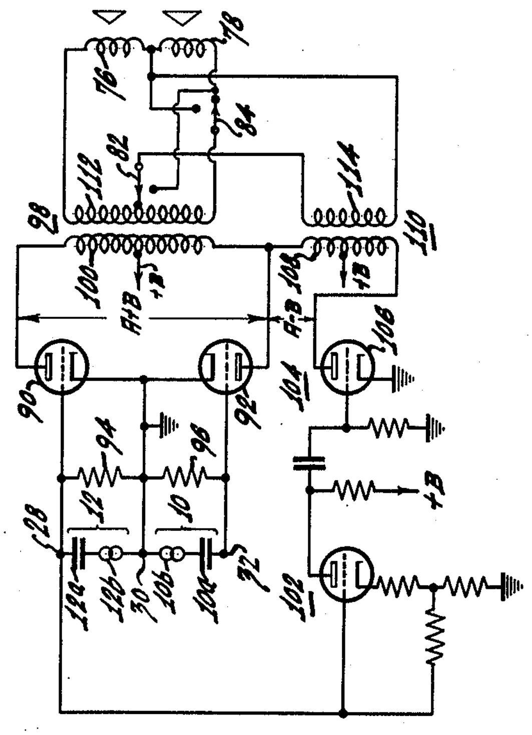
FIGURE 3 is a schematic circuit diagram of a push-pull stereophonic phonograph system embodying the invention.

The stereophonic phonograph amplifying system of FIGURE 3 is connected to provide push-pull amplification of the two stereophonically related signals from the transducing elements 10 and 12. The transducing elements 10 and 12 of a stereophonic pickup, such as that shown in FIGURE 1, are connected with the input electrodes of a pair of amplifying devices such as electron tubes 90 and 92 across the load resistors 94 and 96 respectively. The output circuit for the amplifying devices 90 and 92 comprises a first transformer 98 having a primary winding 100, the centertap of which is returned to an operating potential supply designated +B. Signals appearing at the terminal 28 of the transducing element 12 are applied to a conventional phase inverter stage 102. Signals reversed in phase from those appearing at the terminal 28 are then applied to a third amplifying device 104 which includes a tube 106, the anode of which is connected through the primary winding 108 of a second output transformer 110 to the anode of the tube 92, with the centertap of the winding 108 being returned to the operating potential supply source +B.

The secondary winding 112 of the first output transformer 98 is connected across a pair of serially connected loudspeaker windings 76 and 78, whereas the secondary winding 114 of the second output transformer 110 is connected between the centertap on a secondary winding 112 of the transformer 98 to the junction of the loudspeaker windings 76 and 78. A pair of switches 82 and 84, which may be ganged together for unicontrol operation, are provided for connecting the secondary winding 112 directly across the speaker winding 76, and the secondary winding 114 directly across the speaker winding 78.

Considering now the operation of the stereophonic phonograph system of FIGURE 3, with the transducing elements of a 45–45 pickup phased in the manner described above in connection with FIGURE 1, the lateral signal components are applied to the tubes 90 and 92 in push-pull relation and the vertical signal components are applied to the tubes 90 and 92 in parallel. Accordingly, only the lateral signal components are developed across the secondary winding 112. This is because the vertical signal components cause the tubes 90 and 92 to produce equal and opposite currents in the winding 100 so that the vertical signal components do not appear in the secondary winding 112.

The signals produced by the transducing element 12 at the terminal 28 are phase inverted by the phase inverter 102 and applied to the amplifier 104. As between the input electrodes of the amplifier stages 92 and 104, the vertical signal components are in push-pull relation and the lateral components appear in parallel. Thus, only the vertical signal components produce a signal output across the secondary winding 114 of the output transformer 110. The reason for this, as mentioned above, is that the lateral signal components cause the tubes 92 and 104 to produce equal and opposite currents in the winding 108 so that the lateral signal components do not appear in the secondary winding 114.

Thus, the lateral signal components are amplified in push-pull relation by the tubes 90 and 92 and appear across the secondary winding 112 whereas the vertical signal components are amplified in push-pull relation by the tubes 92 and 106 and appear across the secondary winding 114. These signals are combined in the manner described above in connection with FIGURE 2 to produce the desired driving signals for the windings 76 and 78.

If the stereophonic phonograph system using a 45–45 pickup is to play vertical-lateral records, or using a vertical-lateral pickup is to play 45–45 records, then the switches 82 and 84 are moved from the positions shown to the alternate positions as hereinbefore described.

What is claimed is:

1. In a stereophonic phonograph system for use with records of the type having a pair of stereophonically related recordings cut in the same record groove comprising, a pair of amplifying channels each having an output terminal, a first and a second output transformer each having a primary and a secondary winding, means connecting the primary winding of said first transformer between said output terminals, means connecting the primary winding of said second output transformer to a tap on the primary winding of said first output transformer, a pair of load impedance elements connected in series across the secondary winding of said first output transformer, and means connecting the secondary winding of said second output transformer between the junction of said load impedance elements and a tap on the secondary winding of said first output transformer.

2. A stereophonic phonograph system for use with records of the type having a pair of stereophonically related recordings cut in the same record groove comprising, a pair of amplifying channels each having an output terminal, a first and a second output transformer each having a primary and a secondary winding, means connecting the primary winding of said first transformer between said output terminals, means connecting the primary winding of said second output transformer to a tap on the primary winding of said first output transformer, a pair of load impedance elements connected in series, and switch means for selectively connecting said series connected load impedance elements across the secondary winding of said first output transformer and the secondary winding of said second output transformer between the junction of said load impedance elements and a tap on the secondary winding of said first output transformer or connecting one of said secondary windings across one of said load impedance elements and the other secondary winding across the other of said load impedance elements.

3. In a stereophonic phonograph system for use with records of the type having a pair of stereophonically related recordings cut in the same record groove with each being at the same angle with respect to the record surface and including a stereophonic pickup for deriving a pair of electrical signals corresponding to said stereophonically related recordings, the combination comprising, a pair of amplifying stages each having an input circuit and an output terminal, means for applying each of said stereophonically related electrical signals to a different one of said pair of amplifying stages, a first and a second output transformer each having a primary and a secondary winding, the primary and secondary windings of said first output transformer having centertaps, means connecting the primary winding of said first transformer between said output terminals, means connecting the primary winding of said second output transformer to the centertap on the primary winding of said first output transformer, a pair of sound reproducing means including windings providing load impedance elements connected in series across the secondary winding of said first output transformer, and means connecting the secondary winding of said second output transformer between the junction of said load impedance elements and the tap on the secondary winding of said first output transformer.

4. A stereophonic phonograph system for use with records of the type having a pair of stereophonically related recordings in the same record groove comprising, a pair of signal amplifying devices connected in push-pull relation and each having an input circuit and an output electrode, means for applying electrical signals corresponding to one of said stereophonically related recordings to the input circuit of one of said pair of amplifying devices, means for applying signals corresponding to the other of said pair of stereophonically related recordings to the input circuit for the other of said pair of amplifiers, means providing a phase inversion stage, a third signal amplifying device coupled to said phase inversion stage and having an output electrode, means for applying one of said stereophonically related signals to said phase inversion stage, a first and second output transformers each having a primary winding and a secondary winding, means connecting the primary winding of said first output transformer between the output electrodes of said first and second amplifying devices, means connecting the primary winding of said second transformer between the output electrodes of said second and third amplifying devices, a pair of load impedance elements connected in series across the secondary winding of said first output transformer, and means connecting the secondary winding of the second output transformer between a tap on the secondary winding of said first output transformer and the junction of said load impedance elements.

5. A stereophonic phonograph system for use with records of the type having a pair of stereophonically related recordings cut in the same record groove comprising three amplifiers each having an input circuit, means for applying electrical signals corresponding to one of said stereophonically related recordings to the input circuit of a first of said amplifiers, means for applying signals corresponding to the other of said pair of stereophonically relates recordings to the input circuit of a second of said amplifiers, means for applying said one electrical signal in inverted phase to the third of said amplifiers, first output circuit means connected with two of said amplifiers for deriving the sum of said electrical signals and second output circuit means connected with one of said two amplifiers and the remaining amplifier for deriving the difference between said electrical signals.

6. A stereophonic phonograph system for use with records of the type having a pair of stereophonically related records cut in the same record groove comprising three amplifiers each having an input circuit, means for applying electrical signals corresponding to one of said stereophonically related records to the input circuit of a first of said amplifiers, means for applying signals corresponding to the other of said pair of stereophonically related recordings to the input circuit for a second of said amplifiers, means for applying said one electrical signal in inverted phase to the third of said amplifiers, a first and second output transformer each having a primary winding and a secondary winding, means coupling the primary winding of said first output transformer between said first and second amplifiers, means connecting the primary winding of said secondary transformer between the output electrodes of said second and third amplifiers, and means for applying the signals developed across the secondary windings of said first and second output transformers to a pair of sound reproducing means.

7. A stereophonic amplifier for a pair of stereophonically related signals comprising a pair of amplifying channels each having an amplifying device having input, output and common electrodes, means for applying one of said stereophonically related signals between the input and common electrodes of the amplifying device in one of said channels, means for applying the other of said stereophonically related signals between the input and common electrodes of the amplifying device in the other of said channels, a first and a second output transformer each having a primary and a secondary winding, means connecting the primary winding of said first transformer between the output electrodes of the amplifying devices in said amplifying channels, means connecting the primary winding of said second output transformer between a tap on the primary winding of said first output transformer and said common electrodes, a first load impedance element connected across the secondary winding of said first output transformer, and a second load impedance element connected across the secondary winding of said second output transformer.

8. A stereophonic amplifier for a pair of stereophonically related signals comprising a pair of amplifying channels each having an amplifying device having input, output and common electrodes, means for applying one of said stereophonically related signals between the input and common electrodes of the amplifying device in one of said channels, means for applying the other of said stereophonically related signals between the input and common electrodes of the amplifying device in the other of said channels, a first and a second output transformer each having a primary and a secondary winding, means connecting the primary winding of said first transformer between the output electrodes of the amplifying devices in said amplifying channels, means connecting the primary winding of said second output transformer between a tap on the primary winding of said first output transformer and said common electrodes, a pair of load impedance elements adapted to be connected in series across the secondary winding of one of said output transformers, and means connecting the secondary winding of the other of said output transformers between the junction of said load impedance elements and a tap on the secondary winding of said one of said output transformers.

9. In a stereophonic phonograph system for use with records of the type having a pair of stereophonically related recordings cut in the same record groove comprising in combination, a stereophonic pickup for tracking the groove of a stereophonic record to develop a pair of electrical signals corresponding to said stereophonically related recordings, a pair of amplifying channels each having an output terminal, a first and a second output transformer each having a primary and a secondary winding, means connecting the primary winding of said first transformer between said output terminals, means connecting the primary winding of said second output transformer to a tap on the primary winding of said first output transformer, a pair of load impedance elements connected in series across the secondary winding of said first output transformer, means connecting the secondary winding of said second output transformer between the junction of said load impedance elements and a tap on the secondary winding of said first output transformer and means for coupling said stereophonic pickup to said amplifying channels so that electrical signals corresponding to lateral groove undulations of a record are developed across the secondary winding of said first output transformer and signals corresponding to vertical groove undulations of a record are developed across the secondary winding of said second output transformer.

10. In a stereophonic phonograph system for use with records of the type having a pair of stereophonically related recordings cut in the same record groove comprising, a pair of amplifying channels each having an output terminal, a first and a second output transformer each having a primary and a secondary winding, means connecting the primary winding of said first transformer between said output terminals, means connecting the primary winding of said second output transformer to a tap on the primary winding of said first output transformer, a pair of load impedance elements connected in series across the secondary winding of said first output transformer, a first feedback path connected between one end of the secondary winding of said first transformer and one of said pair of amplifying channels, a second feedback path connected between the other end of the secondary winding of said first transformer and the other of said pair of amplifying channels, and means connecting the secondary winding of said second output transformer between the junction of said load impedance elements and a tap on the secondary winding of said first output transformer.

11. In a stereophonic system for use with a source of stereophonic signals having sum and difference components, a pair of amplifying channels each having an output terminal, a first and a second output transformer each having a primary and a secondary winding, means connecting the primary winding of said first transformer between said output terminals, means connecting the primary winding of said second output transformer to a tap on the primary winding of said first output transformer, a pair of load impedance elements connected in series across the secondary winding of said first output transformer, and means connecting the secondary winding of said second output transformer between the junction of said load impedance elements and a tap on the secondary winding of said first output transformer.

References Cited in the file of this patent

UNITED STATES PATENTS

| | | |
|---|---|---|
| 2,093,540 | Blumlein | Sept. 21, 1937 |
| 2,114,471 | Keller et al. | Apr. 19, 1938 |
| 2,845,491 | Bertram | July 29, 1958 |

FOREIGN PATENTS

| | | |
|---|---|---|
| 451,761 | Canada | Oct. 12, 1948 |

OTHER REFERENCES

Publication, "A Twin Channel Utility Amplifier," by R. S. Houston, Audio Engineering, April 1952.